(12) United States Patent
Ward et al.

(10) Patent No.: US 7,076,537 B2
(45) Date of Patent: Jul. 11, 2006

(54) DESIGNING INTERCONNECT FABRICS

(75) Inventors: Julie A. Ward, Menlo Park, CA (US); Troy A. Shahoumian, Sunnyvale, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 10/027,564

(22) Filed: Dec. 19, 2001

(65) Prior Publication Data

US 2002/0083159 A1    Jun. 27, 2002

Related U.S. Application Data

(63) Continuation-in-part of application No. 09/707,227, filed on Nov. 6, 2000.

(51) Int. Cl.
*G06F 15/177* (2006.01)
*G06F 15/173* (2006.01)
*H01L 25/00* (2006.01)
*H03K 19/177* (2006.01)

(52) U.S. Cl. .................... 709/220; 709/221; 709/222; 709/238; 709/239; 709/241

(58) Field of Classification Search ........ 709/220–222, 709/238, 239, 241
See application file for complete search history.

(56) References Cited

U.S. PATENT DOCUMENTS

| | | | |
|---|---|---|---|
| 4,920,487 A | 4/1990 | Baffes | |
| 5,107,489 A | 4/1992 | Brown et al. | |
| 5,113,496 A | 5/1992 | McCalley et al. | |
| 5,138,657 A | 8/1992 | Colton et al. | |
| 5,245,609 A | 9/1993 | Ofek et al. | |
| 5,307,449 A | 4/1994 | Kelley et al. | |
| 5,329,619 A | 7/1994 | Pagé et al. | |
| 5,524,212 A | 6/1996 | Somani et al. | |
| 5,581,689 A | 12/1996 | Slominski et al. | |
| 5,634,004 A | 5/1997 | Gopinath et al. | |
| 5,634,011 A | 5/1997 | Auerbach et al. | |
| 5,651,005 A | 7/1997 | Kwok et al. | |
| 5,802,286 A * | 9/1998 | Dere et al. | 709/220 |
| 5,805,578 A | 9/1998 | Stirpe et al. | |
| 5,815,402 A | 9/1998 | Taylor et al. | |
| 5,831,610 A * | 11/1998 | Tonelli et al. | 709/220 |
| 5,831,996 A | 11/1998 | Abramovici et al. | |
| 5,835,498 A | 11/1998 | Kim et al. | |
| 5,838,919 A | 11/1998 | Schwaller et al. | |

(Continued)

FOREIGN PATENT DOCUMENTS

WO    WO-96/17458 A    6/1996

OTHER PUBLICATIONS

Li-Shiuan Peh, "Appia topology solver", Sep. 1998, HP Laboratories SSP Technical Report.*

(Continued)

*Primary Examiner*—Zarni Maung
*Assistant Examiner*—Hassan Phillips

(57) ABSTRACT

A technique for designing an interconnect fabric for communication between a set of source nodes and a set of terminal nodes. A design for an interconnect fabric is obtained having an interconnect device layer. The layer is adjacent to either the set of source nodes or the set of terminal nodes. Flow sets that traverse the layer of interconnect devices are identified. A pair of the flow sets are merged thereby alleviating at least one port violation. The technique may be implemented programmatically by a design tool.

31 Claims, 12 Drawing Sheets

U.S. PATENT DOCUMENTS

| | | | |
|---|---|---|---|
| 5,857,180 | A | 1/1999 | Hallmark et al. |
| 5,878,232 | A | 3/1999 | Marimuthu |
| 5,970,232 | A | 10/1999 | Passint et al. |
| 6,003,037 | A | 12/1999 | Kassabgi et al. |
| 6,031,984 | A | 2/2000 | Walser |
| 6,038,219 | A | 3/2000 | Mawhinney et al. |
| 6,047,199 | A | 4/2000 | DeMarco |
| 6,108,782 | A | 8/2000 | Fletcher et al. |
| 6,141,355 | A | 10/2000 | Palmer et al. |
| 6,148,000 | A | 11/2000 | Feldman et al. |
| 6,157,645 | A | 12/2000 | Shobatake |
| 6,195,355 | B1 | 2/2001 | Demizu |
| 6,212,568 | B1 | 4/2001 | Miller et al. |
| 6,247,077 | B1* | 6/2001 | Muller et al. ................. 710/74 |
| 6,253,339 | B1 | 6/2001 | Tse et al. |
| 6,331,905 | B1 | 12/2001 | Ellinas et al. |
| 6,363,334 | B1 | 3/2002 | Andrews et al. |
| 6,526,420 | B1 | 2/2003 | Borowsky et al. |
| 6,539,027 | B1 | 3/2003 | Cambron |
| 6,539,531 | B1 | 3/2003 | Miller et al. |
| 6,557,169 | B1 | 4/2003 | Erpeldinger |
| 6,570,850 | B1 | 5/2003 | Gutierrez et al. |
| 6,594,701 | B1 | 7/2003 | Forin |
| 6,598,080 | B1 | 7/2003 | Nagami et al. |
| 6,603,769 | B1 | 8/2003 | Thubert et al. |
| 6,611,872 | B1 | 8/2003 | McCanne |
| 6,614,796 | B1 | 9/2003 | Black et al. |
| 6,625,777 | B1 | 9/2003 | Levin et al. |
| 6,628,649 | B1 | 9/2003 | Raj et al. |
| 6,631,128 | B1* | 10/2003 | Lemieux .................... 709/220 |
| 6,633,909 | B1 | 10/2003 | Barrett et al. |
| 6,650,639 | B1 | 11/2003 | Doherty et al. |
| 6,668,308 | B1 | 12/2003 | Barroso et al. |
| 6,675,328 | B1 | 1/2004 | Krishnamachari et al. |
| 6,687,222 | B1 | 2/2004 | Albert et al. |
| 6,694,361 | B1 | 2/2004 | Shah et al. |
| 6,697,334 | B1 | 2/2004 | Klincewicz et al. |
| 6,697,369 | B1 | 2/2004 | Dziong et al. |
| 6,697,854 | B1 | 2/2004 | Glassen et al. |
| 6,701,327 | B1 | 3/2004 | Jones et al. |
| 6,724,757 | B1 | 4/2004 | Zadikian et al. |
| 6,744,767 | B1 | 6/2004 | Chiu et al. |
| 6,757,731 | B1 | 6/2004 | Barnes et al. |
| 6,766,381 | B1 | 7/2004 | Barker et al. |
| 6,775,230 | B1* | 8/2004 | Watanabe et al. ........... 370/228 |
| 6,778,496 | B1 | 8/2004 | Meempat et al. |
| 6,804,245 | B1 | 10/2004 | Mitchem et al. |
| 6,853,970 | B1* | 2/2005 | Gupta et al. .................. 703/20 |
| 6,857,027 | B1 | 2/2005 | Lindeborg et al. |
| 2002/0083159 | A1 | 6/2002 | Ward et al. |
| 2003/0065758 | A1 | 4/2003 | O'Sullivan et al. |
| 2003/0145294 | A1 | 7/2003 | Ward et al. |
| 2005/0021583 | A1 | 1/2005 | Andrzejak et al. |

OTHER PUBLICATIONS

Ward, Julie, et al., "Storage Area Network Fabric Design," Pow erPoint presentation given at the Math Sciences Research Institute Conference on Combinatorial Design, Berkeley, California, Nov. 8, 2000.

Ward, Julie, et al., "Storage Area Network (SAN) Fabric Design," Pow erpoint presentation given at the INFORMS International Conference, Maui, Hawaii, Jun. 19, 2001.

Ward, Julie, et al., "Storage Area Network (SAN) Fabric Design," Pow erpoint presentation given at Berkeley, IEOR Department Seminar, Berkeley, California, Oct. 8, 2001.

Mathew Andrews et al., Integrated Scheduling of Unicast and Multicast Traffic in an Input-Queued Switch, 1999. <http://cm.bell-labs.com/cm/ms/who/andrews/infocom99switch.ps>.

Viraphol Chaiyakul, Assignment Decision Diagram for High-Level Synthesis, 1992..

Andre Dehon, Notes on Coupling Processors with Reconfigurable Logic, MIT Transit Project, Transit Note #118, 1995.

Cathy Fulton et al., Impact Analysis of Packet-Level Scheduling On an ATM Shared-Memory Switch, Infocom, vol. 3 pp. 947-954, 1998, IEEE, New York, NY.

Hiroshi Inose, An Introduction to Digital Integrated Communication Systems, pp. 87-89, 1979, Peter Peregrinus Ltd., Stevenage, United Kingdom.

A. Richard Newton, Interface-Based Design; Introduction, University of California at Berkeley, Apr. 1999.

Derek C. W. Pao, A Congestion Control Algorithm for Multipoint-to-Multipoint ABR Service in ATM Network, Proceedings of the IEEE Conference on High Performance Switching and Routing, pp. 167-175, Jun. 26, 2000, IEEE Press, New York, NY.

Rainer Schoenen et al., Weighted Arbitration Algorithms with Priorities for Input-Queued Switches with 100% Thoughput, 1999, <http://www.iss.rwth-aachen.de/Projekte/Theo/papers/Schoenen99bssw.ps.gz>.

Oryal Tanir et al., Structural Reuse In The Design Of ATM Switch Fabrics, 1997.

I. Widjaja et al., Performance Issues in VC-Merge Capable ATM LSRs, RFC 2682, Sep. 1999, The Internet Society, Reston, VA.

U.S. Appl. No. 09/707,227, filed Nov. 6, 2000, Julie Ward.

D. Klingman et al. Netgen: A Program for Generating Large Scale Capacitated Assignment, Transportation and Minimum Cost Flow Network Problems, Management Science 20(5):814-821, 1974, The Institute Of Management Sciences, Providence, RI.

Dimitri P. Bertsekas, Linear Network Optimization: Algorithms and Codes, pp. 253-260, 1991, The MIT Press, Cambridge, MA.

Julie Ward et al., Appia: Automatic Storage Area Network Fabric Design, Conference on File and Storage Technologies (FAST'02), pp. 203-217, Jan. 28, 2002, Usenix, Berkeley, CA.

Staffan Bo Strand, Storage Area Networks and SANTK, Thesis, Dec. 2001, University of Minnesota, Minneapolis, MN.

Matthew T. O'Keefe et al., Designing Fibre Channel Storage Area Networks, Feb. 2001<http://www.borg.umn.edu/fc/papers/SANTK.pdf>.

Robert E. Bixby, Solving Real-World Linear Programs: A Decade and More of Progress, Jan. 2002.

Ravindra K. Ahuja et al., Network Flows: Theory, Algorithms, and Applications, pp. 4-9, 649-686, 1993, Prentice-Hall, Upper Saddle River, NJ.

Christodoulos A. Floudas et al., Quadratic Optimization, 1995.

Parameswaran Ramanathan et al., Resource Placement with Multiple Adjacency Constraints in k-ary n-Cubes, 1995.

Staffan Strand, Automatic Generation of Core/Edge Topology SANs Using SANTK, May 23, 2002.

Joachim P. Walser, Solving Linear Pseudo-Boolean Constraint Problems with Local Search, 1997, American Association for Artificial Intelligence, Menlo Park, CA.

U.S. Appl. No. 10/290,760, filed Nov. 8, 2002, Julie Ward Drew.

U.S. Appl. No. 10/290,643, filed Nov. 8, 2002, Julie Ward Drew.

U.S. Appl. No. 10/845,855, filed May 13, 2004, Julie Ward Drew.

* cited by examiner

DESIGNING INTERCONNECT FABRICS

This is a continuation-in-part of U.S. application Ser. No. 09/707,227, filed Nov. 6, 2000, the contents of which are hereby incorporated by reference.

FIELD OF THE INVENTION

The present invention pertains to the field of networks. More particularly, this invention relates to designing interconnect fabrics of networks.

BACKGROUND OF THE INVENTION

A wide variety of networks may be viewed as a set of source nodes that communicate with a set of terminal nodes via an interconnect fabric. For example, a storage area network may be arranged as a set of computers as source nodes which are connected to a set of storage devices as terminal nodes via an interconnect fabric that includes communication links and devices such as hubs, routers, switches, etc. Devices such as hubs, routers, switches, etc., are hereinafter referred to as interconnect devices.

The communication requirements of an interconnect fabric may be characterized in terms of a set of flow requirements. A typical set of flow requirements specify the required communication bandwidth from each source node to each terminal node. The design of an interconnect fabric usually involves selecting the appropriate arrangement of physical communication links and interconnect devices and related components that will meet the flow requirements.

Prior methods for designing interconnect fabrics are usually based on manual design techniques. Such manual techniques may be based on heuristics and/or prepackaged structures. Unfortunately, such techniques are usually error prone and may result in an over-provisioned interconnect fabric that is more expensive than needed to meet the flow requirements. Moreover, such techniques are usually time-consuming and may require expert intervention, thereby increasing design costs.

SUMMARY OF THE INVENTION

A technique is disclosed for designing an interconnect fabric for communication between a set of source nodes and a set of terminal nodes. The technique may be used to efficiently and programmatically produce cost-effective interconnect fabrics over a range of design problems.

In one aspect, a method is provided for designing an interconnect fabric for communication between a set of source nodes and a set of terminal nodes. A design for an interconnect fabric is obtained that has an interconnect device layer. The layer is adjacent to either the set of source nodes or the set of terminal nodes. Flow sets that traverse the layer of interconnect devices are identified. A pair of the flow sets are merged thereby alleviating at least one port violation. The design may then be implemented.

The merging may add a second interconnect device layer to the design. The method may be repeatedly performed, adding additional interconnect device layers, until port violations are no longer present in the design In another aspect, a system for designing an interconnect fabric for communication between a set of source nodes and a set of terminal nodes is provided. A design for an interconnect fabric has at least one interconnect device layer. A fabric design tool modifies the design for the interconnect fabric by identifying flow sets that traverse the layer of interconnect devices and merging a pair of the flow sets, thereby alleviating at least one port violation.

The fabric design tool may add a second interconnect device layer to the design by merging a pair of the flow sets. The fabric design tool may repeatedly add additional interconnect device layers to the design until port violations are no longer present in the design.

In a further aspect, a method of designing an interconnect fabric for communication between a set of source nodes and a set of terminal nodes is provided. A design for an interconnect fabric is obtained having a interconnect device layer adjacent to either the set of source nodes or the set of terminal nodes. Interconnect device layers are formed adjacent to either the set of source nodes or terminal nodes, and are, thus, added to the design, until the design satisfies a set of flow requirements between the source nodes and terminal nodes without port violations. To form the interconnect device layers, flow sets that traverse the interconnect device layer may be identified and pairs of the flow sets merged.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
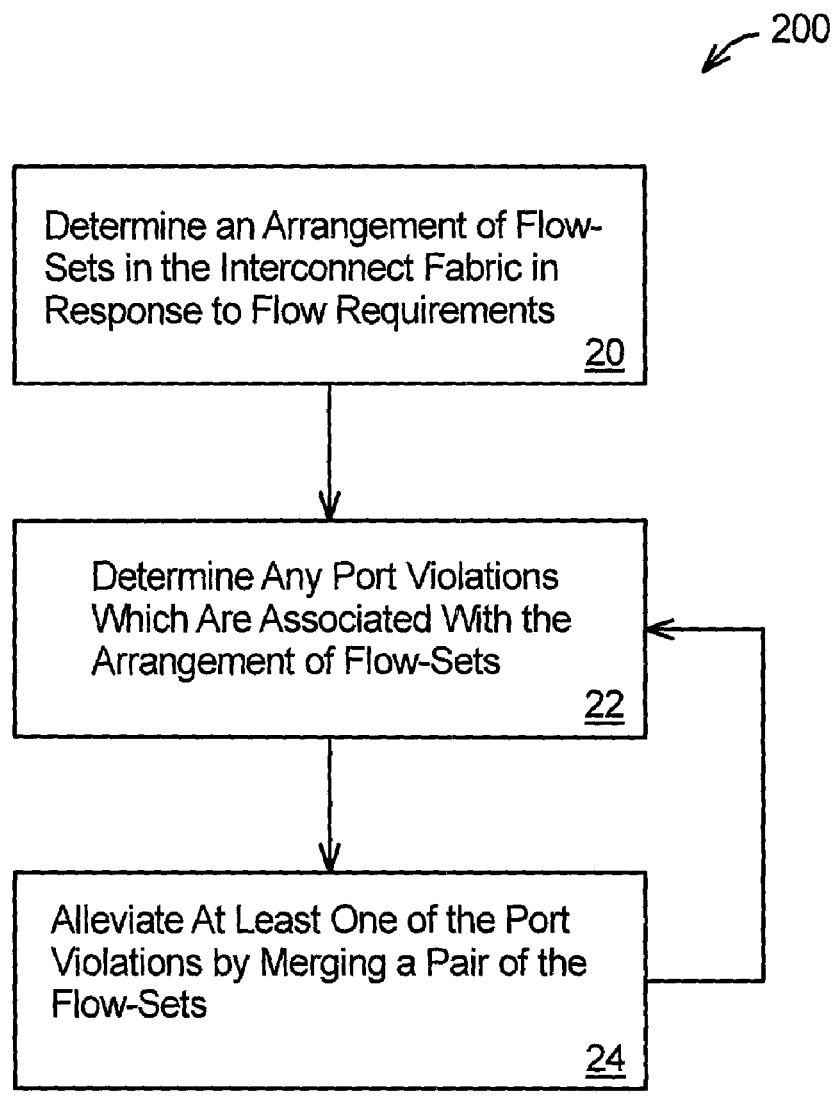
FIG. 1 shows a method for designing an interconnect fabric according to an embodiment of the present invention.

FIG. 1 shows a method 200 for designing an interconnect fabric according to an embodiment of the present invention. The method 200 partitions the flow requirements of the interconnect fabric into flow sets and iteratively merges the flow sets while taking into account the feasibility and cost of the implementing the interconnect fabric.

At step 20, an arrangement of flow sets in the interconnect fabric is determined in response to a set of flow requirements for the source and terminal nodes. In one embodiment, step 20 is performed by generating a flow set for each flow specified in the flow requirements for the interconnect fabric.

Table 1 shows an example set of flow requirements for an interconnect fabric under design.

|  | Terminal Node 50 | Terminal Node 52 | Terminal Node 54 |
|---|---|---|---|
| Source Node 40 | a | b | c |

-continued

|  | Terminal Node 50 | Terminal Node 52 | Terminal Node 54 |
|---|---|---|---|
| Source Node 42 | d | e | f |
| Source Node 44 | — | g | h |

The flow requirements in this example specify three source nodes (source nodes 40–44 in the figures below) and three terminal nodes (terminal nodes 50–54 in the figures below). If an interconnect fabric is to meet the flow requirements, it must contain communication paths between all pairs of the source and terminal nodes 40–44 and 50–54 having positive flow requirements and must have sufficient bandwidth to support all of the flow requirements simultaneously.

In one embodiment, the source nodes 40–44 are host computers and terminal nodes 50–52 are storage devices and the bandwidth values a–h are numbers expressed in units of megabits per second. Thus, the interconnect fabric under design may be storage area network.

In other embodiments, there may be multiple flow requirements between a given source and terminal node pair. In such embodiments, the cells of Table 1 would contain a list of two or more entries.

Figure 2:
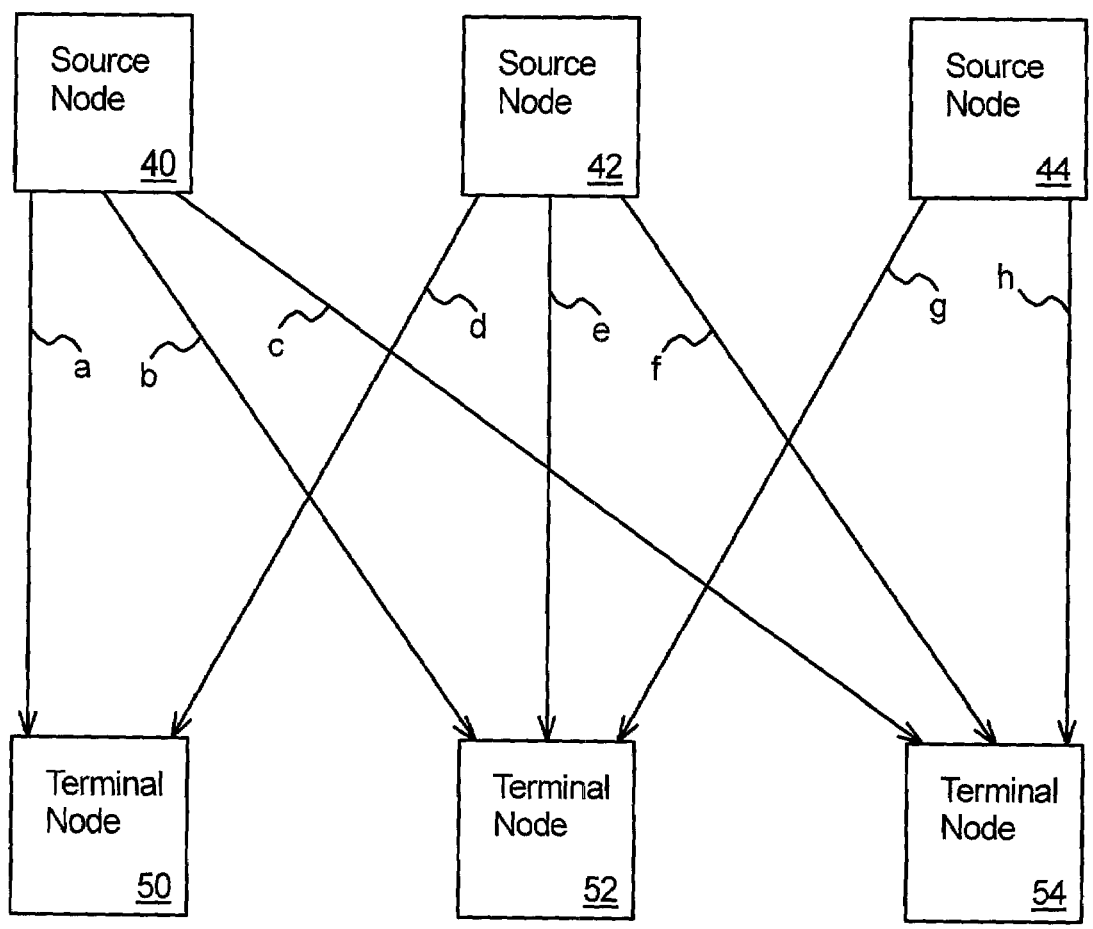
FIGS. 2–6 shows an evolving arrangement of flow sets in an interconnect fabric for an example design according to an embodiment of the present invention.

FIG. 2 shows an initial arrangement of flow sets in the interconnect fabric obtained at step 20 for this example. Initially, a flow set is generated for each flow set forth in the flow requirements. Accordingly, a flow set having a flow of a is generated for a connection between the source node 40 and the terminal node 50, a flow set having a flow of b is generated for a connection between the source node 40 and the terminal node 52, and a flow set having a flow of c is generated for a connection between the source node 40 and the terminal node 54. Similarly, flow sets having flows of d, e, and f, respectively, are generated for connections from the source node 42 to the terminal nodes 50–54 and flow sets having flows of g and h, respectively, are generated for connections from the source node 44 to the terminal nodes 52–54.

At step 22, port violations which are associated with the arrangement of flow sets in the interconnect fabric are determined. Port violations are determined for each source node 40–42 and each terminal node 50–52. In general, the number of port violations for a node is equal to the sum, over all flow sets, of the number of required physical communication links to the node from that flow set, minus the number of available ports in the node because each flow set may require one or more physical communication links to a given source or terminal node in the network. In this example, the number of port violations for a node is equal to the number of flow sets connected to the node minus the number of available ports in the node because each flow set is carried by one physical communication link in the interconnect fabric.

In this example, each source node 40–42 and each terminal node 50–52 has two available ports for connections to the interconnect fabric. Therefore, the source node 40 has a port violation of one since each of its three flow sets requires one physical communication link to the source node 40 and the source node 40 has only two available ports. Similarly, the source nodes 42–44 have port violations of one and zero, respectively, and the terminal nodes 50–54 have port violations of zero, one, and one, respectively, in the interconnect fabric. In other examples, the number of available ports on the source nodes 40–42 and the terminal nodes 50–52 may differ and the number of physical communication links required by a flow set on a given source or terminal node it connects to may exceed one.

At step 24, at least one of the port violations is alleviated by merging a pair of the flow sets. Step 24 initially involves selecting the pair of flow sets in the current interconnect fabric that are to be merged. Initially, a candidate pair of flow sets is chosen that would alleviate the port violation on a node with the greatest port violation if merged. If there is more than one such candidate pair then one of the candidate pairs that alleviates a port violation on a node having the next greatest port violation is chosen from among them. If there is more than one such candidate pair then a pair of them that would be least costly to merge is chosen. The cost of merging two candidate pairs may be determined by choosing the least expensive interconnect device that is feasible for the merged flow set.

In the current state of the example interconnect fabric shown in FIG. 2, the source nodes 40–42 and the terminal nodes 52–54 each have a port violation of one, which is the worst port violation in the network, and their corresponding flow sets are candidates for merging at step 24. For example, the pair of flow sets having flows a and b or the pair of flow sets having flows a and c or the pair of flow sets having flows b and c are chosen as candidate pairs. All of these candidate pairs if merged would alleviate one port violation from the source node 40 but none of them would alleviate any other port violations. The same may be said for mergers of any two of the flow sets having flows d, e, and f, any two of the flow sets having flows b, e, and g, and any two of the flow sets having flows c, f, and h. Therefore, the cost of merging the candidate pairs is used to select the candidate pair of flow sets having flows b and c for merger at step 24. For example, the communication link and/or interconnect device and/or ports that are used to merge the flow sets having flows b and c may be less expensive than the equivalent components needed to merge the other equally qualified candidate pairs.

The candidate pairs of flow sets considered at step 24 must be feasible to merge. An example of a pair of flow sets that is not feasible to merge is a pair for which an interconnect device of sufficient bandwidth is not available. For example, a flow set having 60 units of bandwidth cannot be merged with a flow set having 50 units of bandwidth if the highest bandwidth interconnect device available is 100 units. Another example of a pair of flow sets that is not feasible to merge is a pair that would exceed the available ports on every available interconnect device of the resulting flow set. Candidate pairs that are not feasible to merge are bypassed at step 24 in favor of other candidate pairs.

If port violations still exist in the interconnect fabric after step 24, then another candidate pair of flow sets is selected and merged in a repeat of step 24. The method 200 loops through steps 22–24 in an iterative fashion until all port violations are eliminated or until no further merges are feasible.

Figure 3:
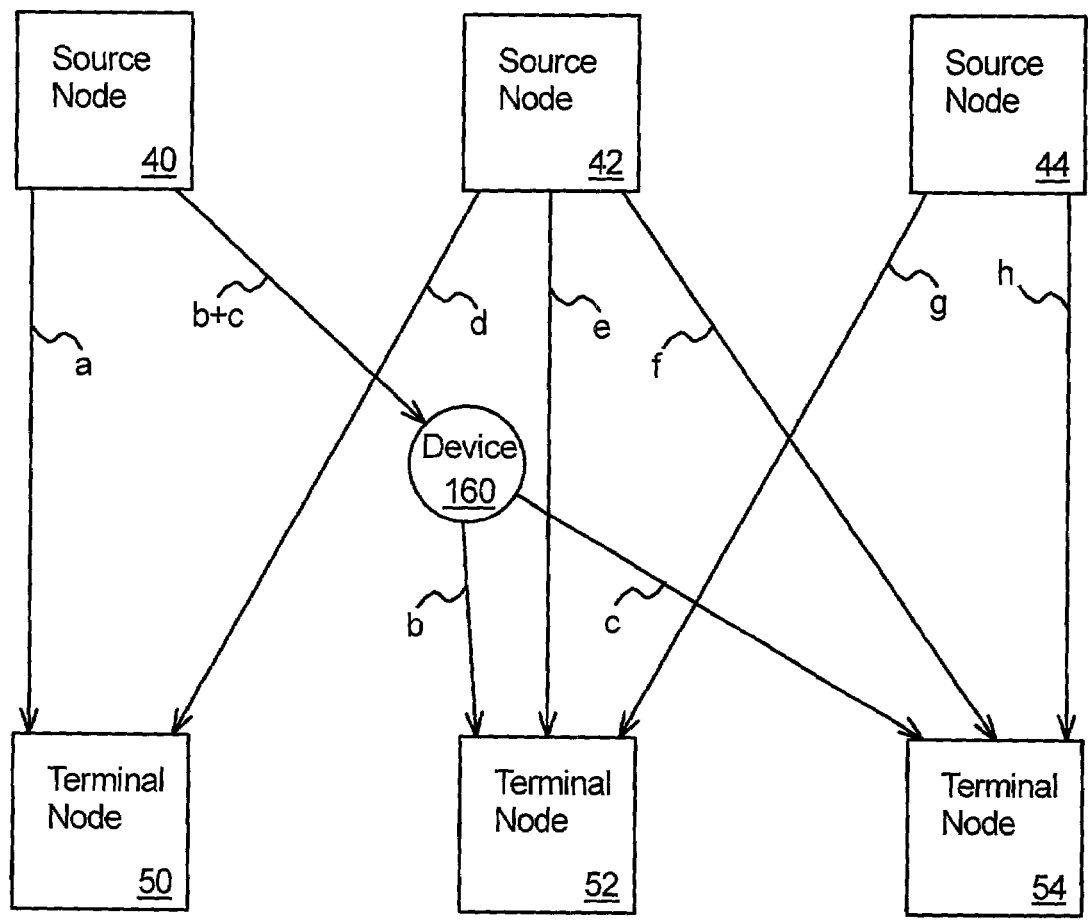

FIG. 3 shows an interconnect fabric that results from the first pass through step 24. A flow set having an interconnect device 160, a flow of b, and a flow of c is the result of the merger of the flow set having the flow of b and the flow set having the flow of c. At this point, the interconnect fabric has a port violation of one at the source node 42 and a port violation of one at each of the terminal nodes 52 and 54. The next pass through step 24 results in the selection and merger of the flow set corresponding to the interconnect device 160 with the flow set having the flow of e which will alleviate the port violation of the terminal node 52.

Figure 4:
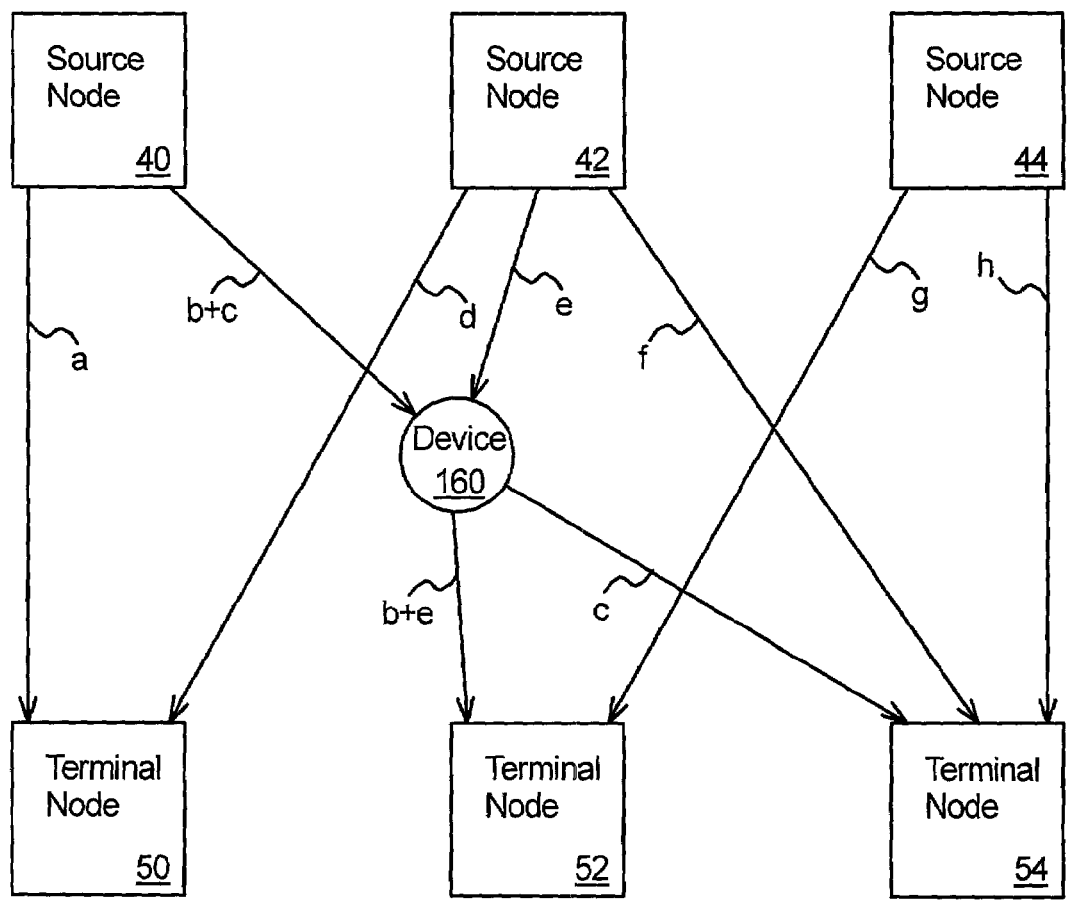

FIG. 4 shows an interconnect fabric that results from the second pass through step 24. The flow set corresponding to the interconnect device 160 now carries the flow of e in addition to the flows of b and c. At this point, the interconnect fabric has a port violation of one at the source node 42 and a port violation of one at the terminal node 54. The next pass through step 24 results in the selection and merger of the flow set having the flow of f with the flow set corresponding to the interconnect device 160 which will alleviate the port violation of the source node 42 as well as the port violation of the terminal node 54.

Figure 5:
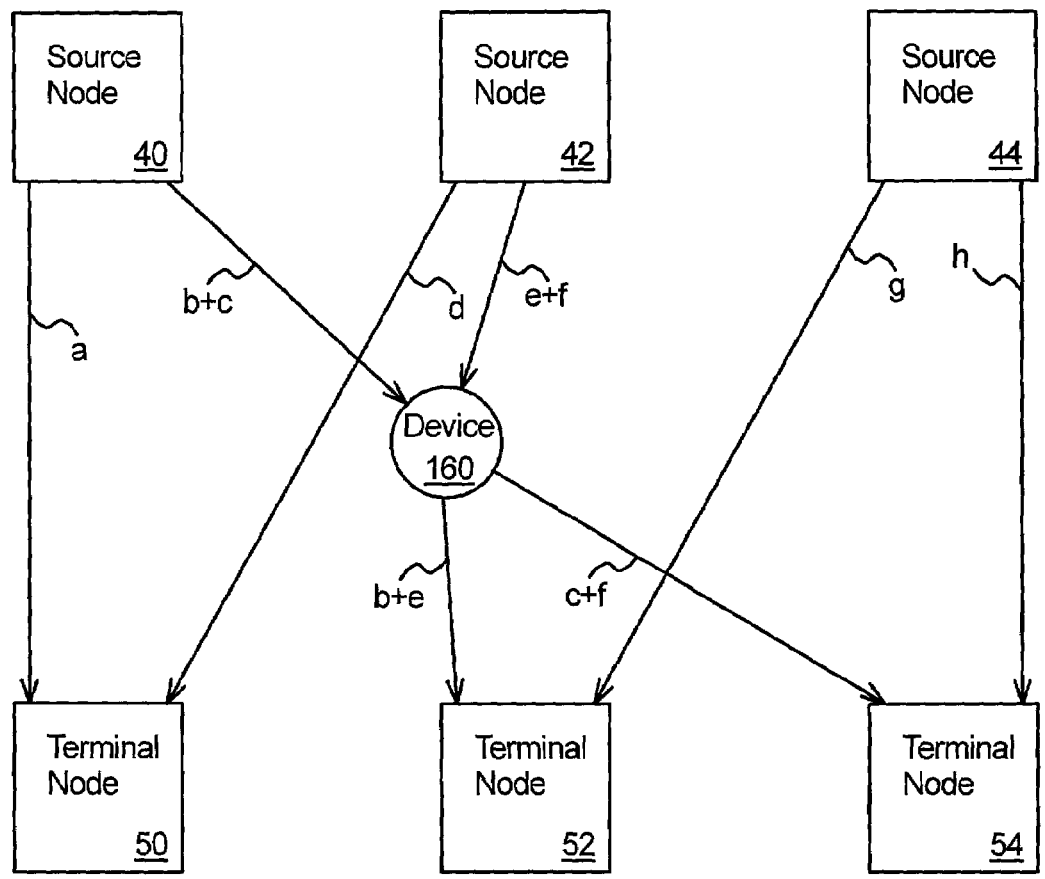

FIG. 5 shows an interconnect fabric that results from the third pass through step 24. The flow set corresponding to the interconnect device 160 now carries the flow of f as well as the flows b, c, and e. At this point, the interconnect fabric has no port violation remaining. However, a cost saving may be obtained by merging the flow set having the flow of a into the flow set corresponding to the interconnect device 160. That merger would obviate the need for a communication link between the source node 40 and the terminal node 50, replacing that link with one between the interconnect node 160 and the terminal node 50, and thereby saving the costs associated with a port on the source node 40 in exchange for the lower costs, in this example, of a port on the interconnect node 160.

Figure 6:
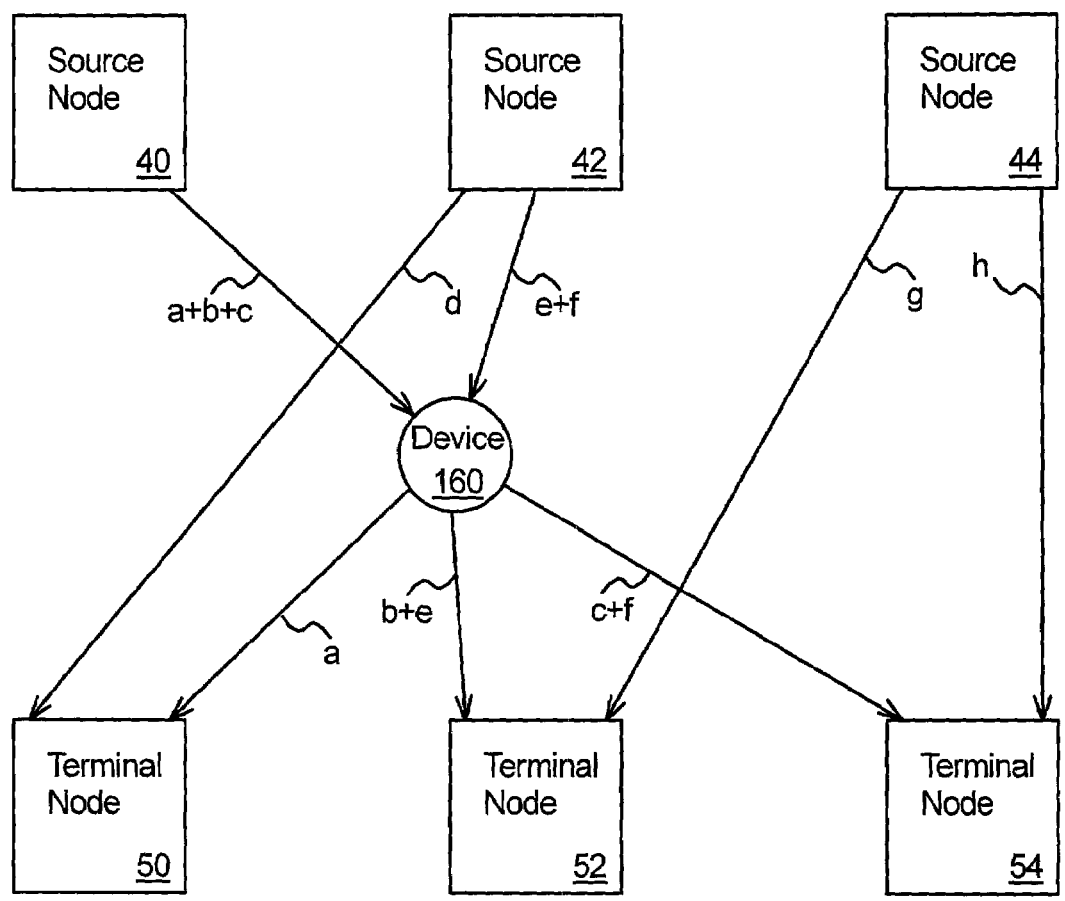

FIG. 6 shows an interconnect fabric that results from merging the flow set having the flow of a into the flow set corresponding to the interconnect device 160. The flow set corresponding to the interconnect device 160 now includes the flow a in addition to the flows of b, c, e, and f. At this point, the interconnect fabric has no port violation remaining and no remaining opportunities for cost saving.

In this embodiment, each flow set has at most one interconnect device associated with it and all of the flows for the flow set are routed through that interconnect device or a single communication link if possible. When a pair of flow sets are merged, their existing interconnect devices, if any, are replaced by a single interconnect device which may be of a different type than the replaced interconnect devices. Usually, the interconnect device that results in the least expensive routing of the flows in the flow set is chosen from among those interconnect devices that are feasible for the flow set.

Figure 7:
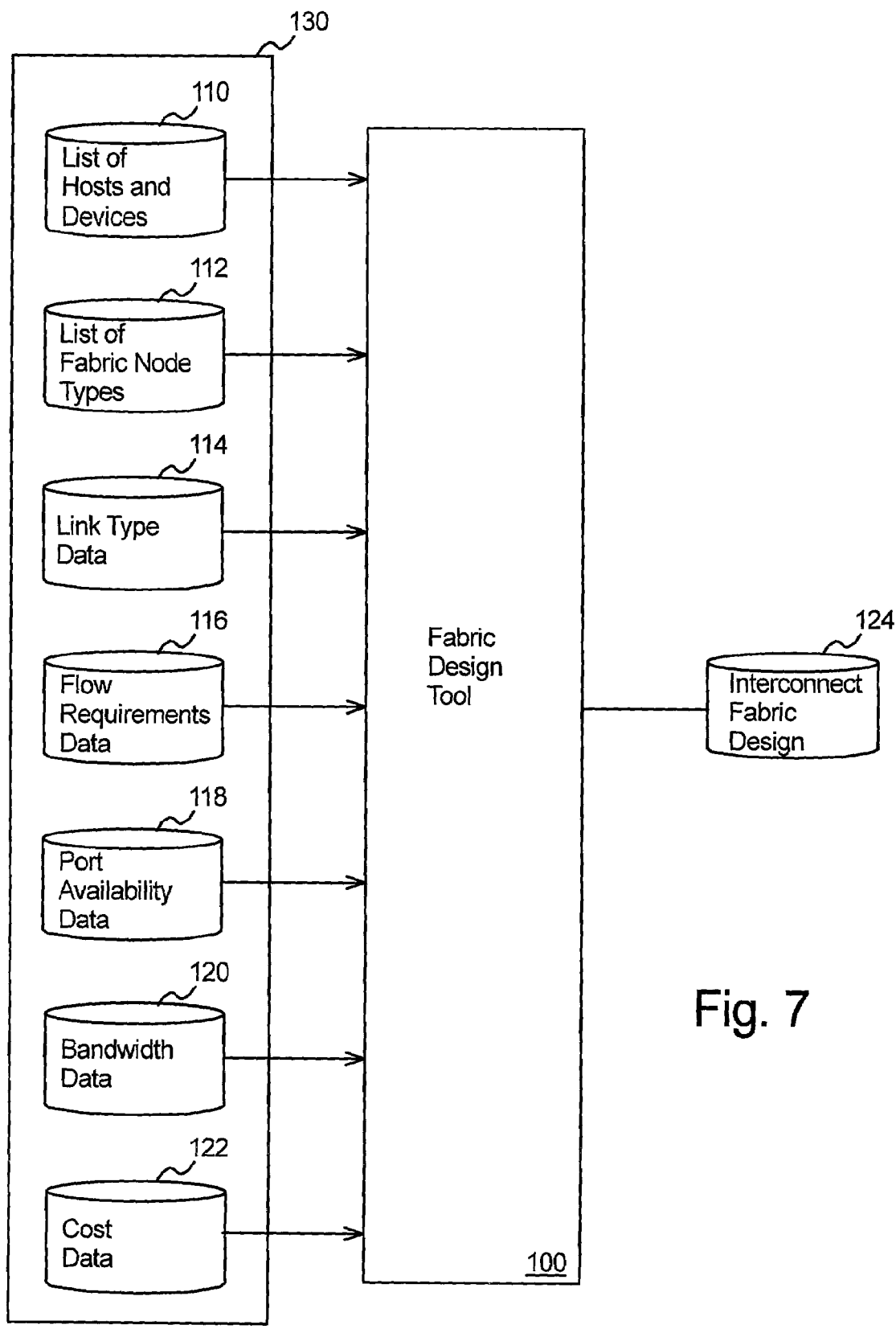
FIG. 7 shows a fabric design tool that may employ techniques of the present invention to generate an interconnect fabric design in response to a set of design information.

FIG. 7 shows a system having a fabric design tool 100 that may employ the method 200 to generate an interconnect fabric design 124 in response to a set of design information 130. The fabric design tool 100 may be implemented in software and/or hardware to perform its functions. The design information 130 in one embodiment includes a list of hosts (source nodes) and devices (terminal nodes) 110, a list of fabric node types 112, a list of link type data 114, a set of flow requirements data 116, a set of port availability data 118, a set of bandwidth data 120, and a set of cost data 122. The design information 130 may be implemented as an information store, such as a file or set of files, or a database, etc.

The list of hosts and devices 110 may specify the hosts and devices which are to be interconnected by the interconnect fabric design 124.

The list of fabric node types 112 may specify available interconnect devices, such as hubs, routers, switches, etc.

The link type data 114 may specify a list of available communication links that may be employed in the interconnect fabric design 124 and any relevant constraints. There are numerous examples of available communication links including fiber optic links, fibre channel links, wire-based links, and links such as SCSI as well as wireless links.

The flow requirements data 116 may specify the desired flow requirements for the interconnect fabric design 124. The desired flow requirements may include bandwidth requirements for each pairing of the source and terminal nodes.

The port availability data 118 may specify the number of communication ports available on each source node and each terminal node and each available interconnect device.

The bandwidth data 120 may specify the bandwidth of each host and device port and each type of fabric node and link.

The cost data 122 may specify costs associated with the available communication links and interconnect devices that may be employed in the interconnect fabric design 124. The cost data 122 may also specify the costs of ports for source and terminal nodes and interconnect devices. Other relevant costs may also be indicated.

The interconnect fabric design 124 generated by the fabric design tool 100 includes a list of the physical communication links and interconnect devices and ports, etc. and may include cost data.

In some cases, an existing design for an interconnect fabric may not be entirely satisfactory. For example, the method 200 generally results in a fabric design of a single layer in which there are no links between device nodes. Under certain circumstances, a single-layer fabric may not eliminate all of the port violations. In which case, the method 200, by itself, may not result in a fabric design in which there are no port violations. This can occur due to various factors, such as flow requirements and port availability limits at the source, terminal and/or device nodes. Other design techniques, such as manual or other methods, may also result in a design for an interconnect fabric which is not entirely satisfactory.

As an example of design in which there exist port violations, assume that the set of design information 130 includes the flow requirements as given in Table 1 and also includes additional constraints on port availability. The additional port availability constraints, for this example, may be that instead of two ports, the source node 40 and the terminal node 52 each have only one port and that available interconnect devices cannot exceed four ports. With these constraints, the configuration of FIG. 6 would not be possible because it requires that the device node 160 have five ports.

Returning to FIG. 5, given the further constraints, there still exist port violations on source node 40 and on terminal node 52. Because the nodes 40 and 52 have two flows connected to them, but only one port, the port violation for each is one. However, no additional merges of flow sets are feasible using the method 200. For example, to relieve the port violation at source node 40, the flow set having flow a would need to be merged with the flow set having flows b and c. However, the flow set having flows b and c has already been merged by the device 160 and the device 160 cannot connect flow a to terminal node 50 because all of the ports of the device 160 are already in use. Similarly, to relieve the port violation at terminal node 52, the flow set having flows b and e would need to be merged with the flow set having flow g. However, the flow set having flows b and e has already been merged by the device 160 and the device 160 cannot connect flow g to terminal node 52 because all of ports of the device 160 are already in use.

Thus, in one embodiment, the present invention addresses remaining port violations in an obtained interconnect fabric by recursively generating additional layers of interconnect fabric nodes. For port violations at source nodes, the problem (i.e. the current fabric configuration and the applicable design information) may be recast such that the device nodes are treated as the terminal nodes. Then, one or more additional layers of device nodes may be inserted between the source nodes and the device nodes to relieve the port violations at source nodes. This results in links between device nodes and, thus, increases the number of layers in the interconnect fabric. Similarly, for terminal port violations, the problem may be recast such that the device nodes are treated as the source nodes. Then, one or more additional layers of device nodes may be inserted in between the device nodes and the terminal nodes to relieve the terminal node port violations. This also results in links between the device nodes and, thus, increases the number of layers in the interconnect fabric.

Figure 8:
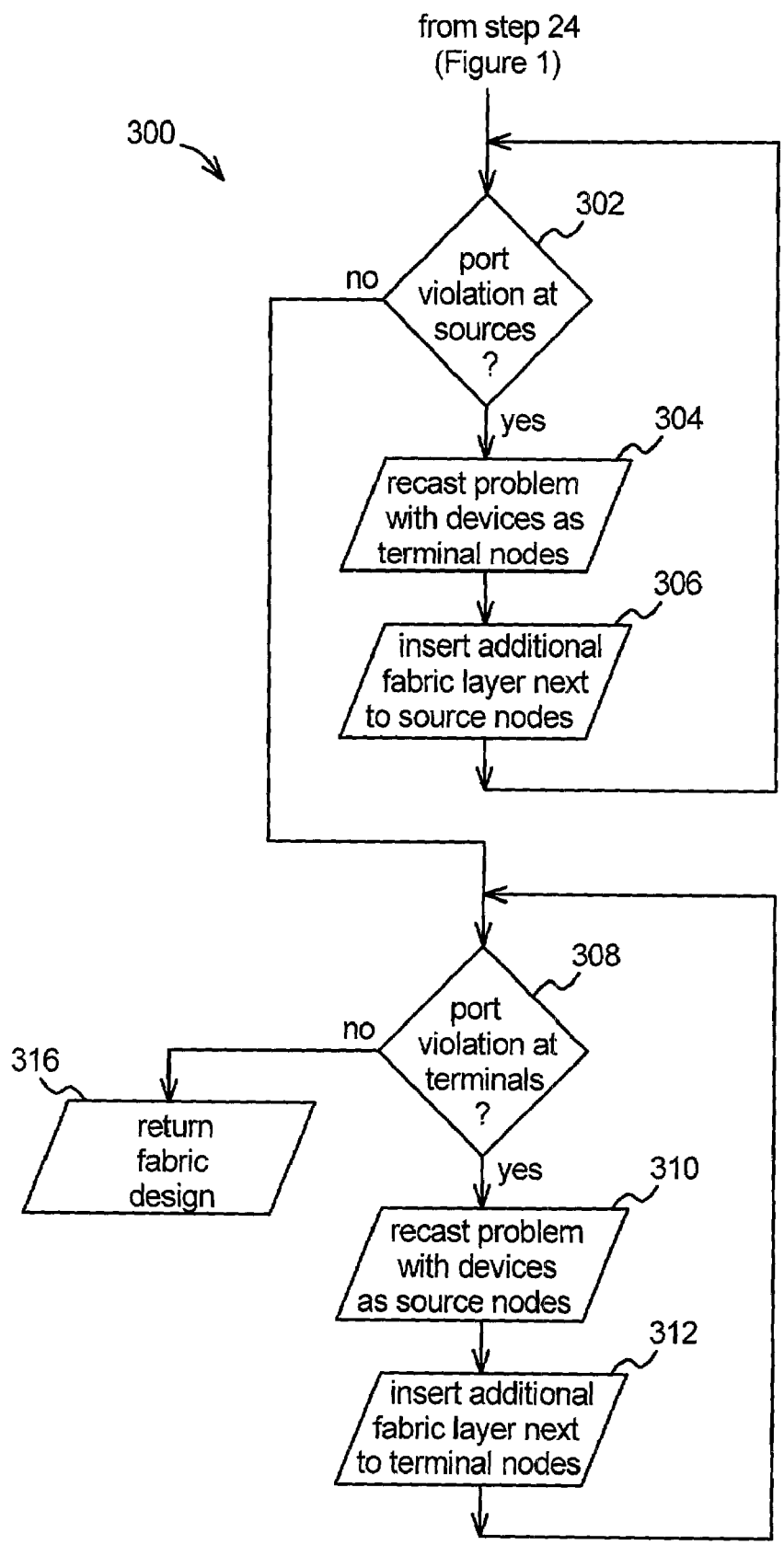
FIG. 8 shows a method for resolving port violations by adding layers to the interconnect fabric in accordance with an embodiment of the present invention.

FIG. 8 shows a method 300 for resolving port violations by adding layers to an existing interconnect fabric in accordance with an embodiment of the present invention. The design tool 100 of FIG. 1 may implement the method 300. Further, the method 300 may be continuation of the method 200 of FIG. 1 in which an interconnect fabric is obtained that may include port violations. In which case, a step 302 in FIG. 8 may follow the step 24 of FIG. 1. Alternately, rather than the technique of FIG. 1, another technique for forming an interconnect fabric, such as manual or other methods, may be employed to obtain an interconnect fabric prior to employing the method 300.

In the step 302, a determination may be made as to whether there exist any port violations at source nodes. Assuming there is one or more such port violations, step 304 may be performed. As mentioned, for the example of FIG. 5 with the additional port availability constraints, there is a port violation of degree one at the source node 40. At step 304, the device nodes may be recast as terminal nodes.

Figure 9:
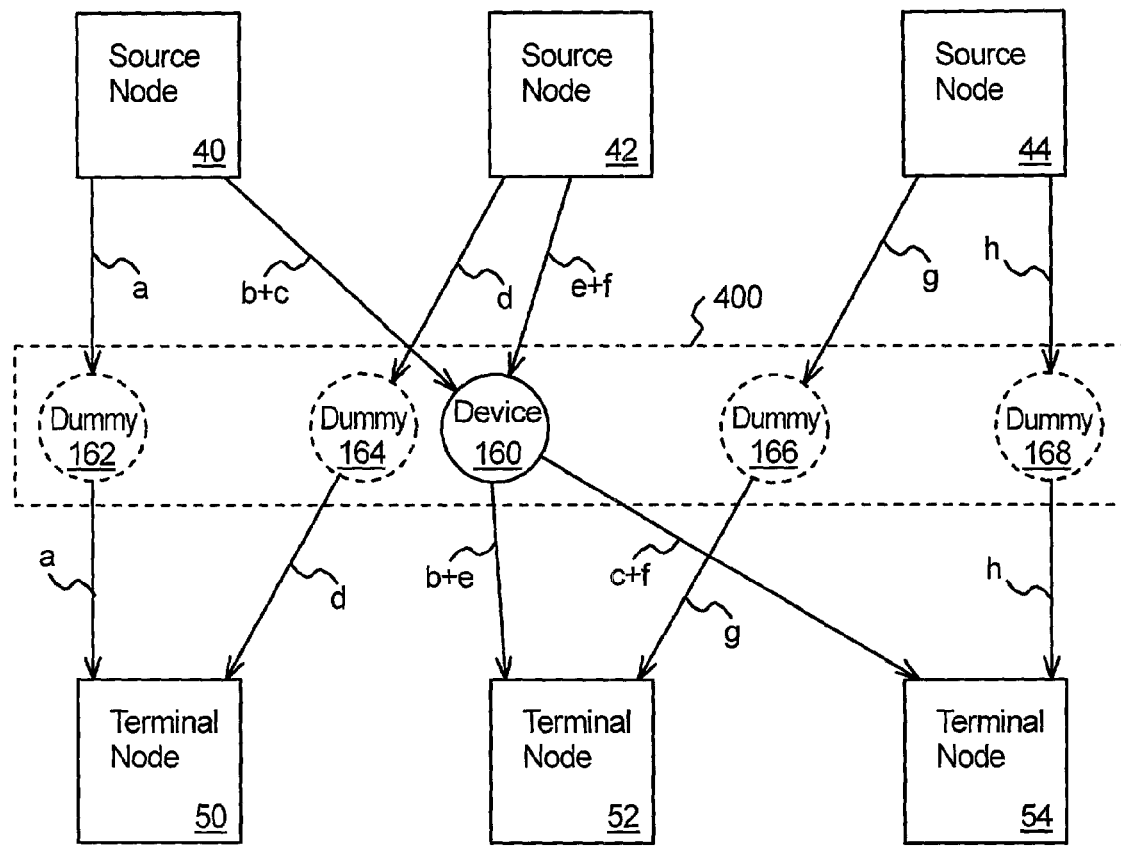
FIGS. 9–12 show an evolving arrangement of flow sets in an interconnect fabric for another example design according to an embodiment of the present invention.

FIG. 9 shows an interconnect fabric that has been recast in accordance with an embodiment of the invention. In step 304, a layer of existing interconnect fabric devices that is adjacent to the source nodes that have port violations may be identified. In the example of FIG. 9, the existing fabric includes a single layer 400 of existing devices. As such, the layer 400 is adjacent to the source nodes 40, 42 and 44. For links which pass through the adjacent layer 400 without terminating at a device node, "dummy" nodes may be inserted in the layer 400. Thus, each link which enters the layer 400 terminates at either a device node or a dummy node. In the example of FIG. 9, the links for flows a, d, g and h pass through the layer 400 without terminating at a device node. Accordingly, dummy nodes 162, 164, 166, and 168 may be inserted into the links for flows a, d, g and h, respectively.

The dummy nodes may be thought of as being logically equivalent to a link or to a repeater node which has two ports. The dummy nodes need not actually be inserted into the fabric as physical devices, but are useful constructs to act as link terminators in the layer 400. It will be apparent, however, that the present invention may be implemented without the use of such dummy nodes. In which case, flow sets which traverse the layer 400 are merged for alleviating port violations without regard as to whether the corresponding links actually terminate in the layer 400. More particularly, flow sets between the layer 400 and source nodes may be merged for alleviating port violations at the source nodes and flow sets between the layer 400 and terminal nodes may be merged for alleviating port violations at terminal nodes.

Also in the step 304, the dummy nodes and device nodes in the layer 400 may be recast as terminal nodes. Thus, all of the flows which pass through the layer 400 may be treated as simply terminating in the layer 400. In the example of FIG. 9, the flow a may be treated as terminating at dummy node 162, the flow d may be treated as terminating at dummy node 164, the merged flow set having flows b and c and the merged flow set having flows e and f may be treated as terminating at the device node 160, the flow g may be treated as terminating in the dummy node 166 and the flow h may be treated as terminating in the dummy node 168. The terminal nodes 50, 52 and 54 may be ignored in the step 304.

Then, in a step 304, an additional layer of device nodes may be inserted between the source nodes and the layer currently closest to the source nodes. In the example of FIG. 9, the additional layer may be inserted between the layer 400 and the source nodes 40, 42 and 44. In one embodiment, this additional layer may be formed by the method of FIG. 1. Alternately, the additional layer may be formed by manual or other techniques.

Assuming the method 200 of FIG. 1 is employed in the step 306, the port violations at source nodes may be identified (if they have not been already) and then flow sets may be merged to alleviate the port violations. As in the method 200 of FIG. 1, candidate flow sets may be evaluated prior to merging to determine the feasibility of merging them, the relative magnitude of existing port violations and the potential for merging candidate flow sets to reduce the existing port violations and the costs of devices needed to effect the various possible mergers.

Figure 10:
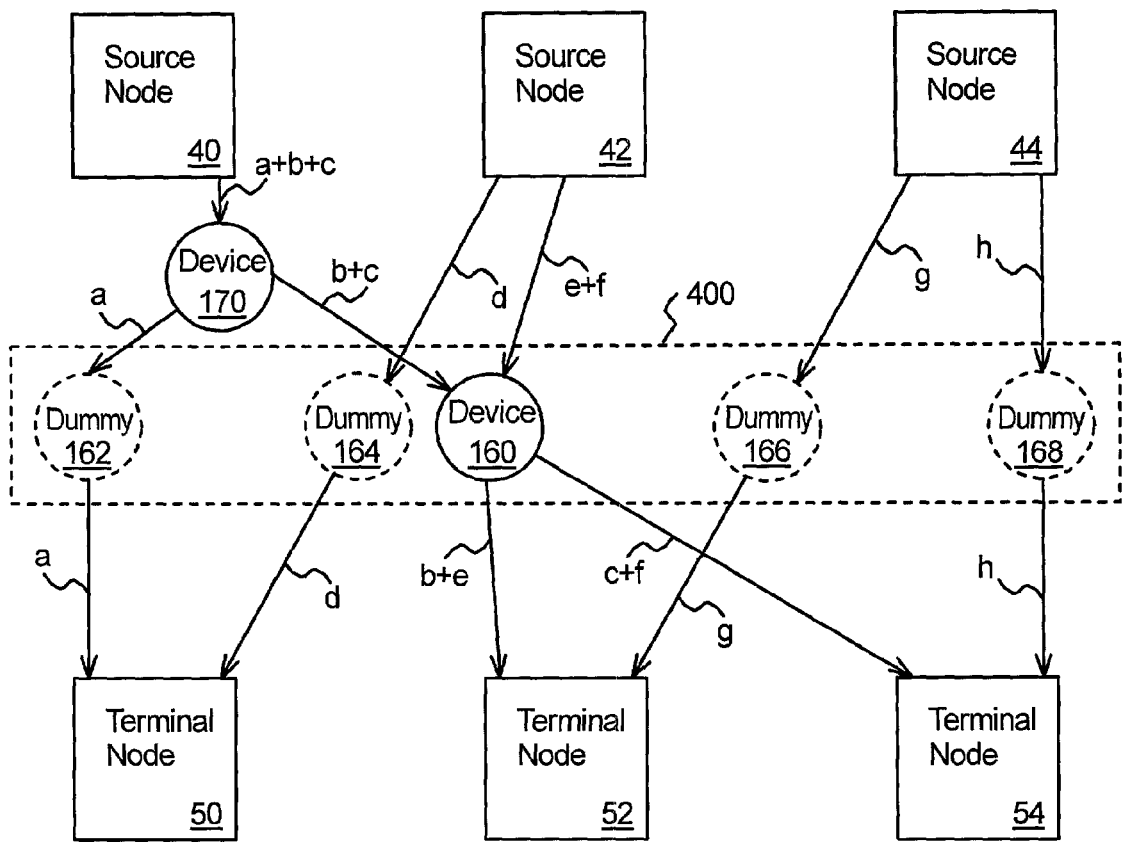

In the example of FIG. 9, the only port violation among the source nodes 40, 42 and 44, is at the source node 40 and is a port violation of one. To alleviate this port violation, the flow set having flow a and the flow set having the flows b and c may be merged. This is shown in FIG. 10 where an interconnect device 170 has been inserted to merge these flow sets. Note that there is now a link between the device 170 and the device 160. Accordingly, the addition of the device 170 adds a layer to the interconnect fabric.

The step 306 may terminate similarly to the method 200 of FIG. 1. Thus, the step 306 may terminate when no additional merges among flow sets in the newly added device layer are feasible or likely to result in a cost savings.

Next, the determination step 302 may be repeated in which a determination is made as to whether there exist any port violations at the source nodes. If violations remain, then the steps 304 and 306 may be repeated to add another layer between the prior layer and the source nodes. This process may be performed recursively, each time adding a layer of devices to the interconnect fabric and reducing the number of port violations at the source nodes. Each new layer is added between the prior layer and the source nodes. Thus, in the example, if another layer were required, the layer of devices that includes the device 170 would next be recast as the terminal nodes.

In the example of FIG. 10, the addition of the layer that includes the device 170 eliminates the port violation at the source node 40. Accordingly, no additional port violations at source nodes remain and, thus, no additional layers are needed. Under other circumstances, however, one or more additional layers may be required to eliminate all such port violations.

Once all of the port violations at the source nodes have been eliminated, one or more layers of device nodes may be added adjacent to the terminal nodes in order to alleviate any port violations at the terminal nodes. Thus, after a negative determination in the step 302, a step 308 may be performed.

In the step 308, a determination may be made as to whether there are any port violations at the terminal nodes.

Assuming there is one or more such port violations, step 310 may be performed. As mentioned, for the example of FIG. 5, there is a port violation of degree one at the terminal node 52. At step 310, the problem may be recast with a layer of device nodes treated as source nodes.

Thus, in the step 310, a layer of existing interconnect fabric devices that is adjacent to the terminal nodes that have port violations may be identified. In the example of FIGS. 9 and 10, the existing device layer 400 is adjacent to the terminal nodes 50, 52 and 54. Accordingly, dummy nodes may be inserted as shown in FIG. 9. In the step 310, however, the dummy nodes and device nodes in the layer 400 are now recast as source nodes, rather than terminal nodes as in step 304.

Thus, all of the flows which pass through the layer 400 may be treated as originating in the layer 400. In the example, the flow a may be treated as originating at dummy node 162, the flow d may be treated as originating at dummy node 164, the merged flow set having flows b and e and the merged flow set having flows c and f may be treated as originating at the device node 160, the flow g may be treated as originating in the dummy node 166 and the flow h may be treated as originating in the dummy node 168. The source nodes 40, 42 and 44 may be ignored in the step 310.

Then, in a step 312, an additional layer of device nodes may be inserted between the prior layer and the terminal nodes. The example of FIG. 9, the additional layer may be inserted between the layer 400 and the terminal nodes 50, 52 and 54. In one embodiment, this additional layer may be formed by the method of FIG. 1. Alternately, the additional layer may be formed by manual or other techniques.

Assuming the method 200 of FIG. 1 is employed in the step 312, the port violations at terminal nodes may be identified (if they have not been already) and then flow sets may be merged to alleviate the port violations. As in the method 200 of FIG. 1, candidate flow sets may be evaluated prior to merging to determine the feasibility of merging them, the relative magnitude of existing port violations and the potential for merging candidate flow sets to reduce the existing port violations and the costs of devices needed to effect the various possible mergers.

Figure 11:
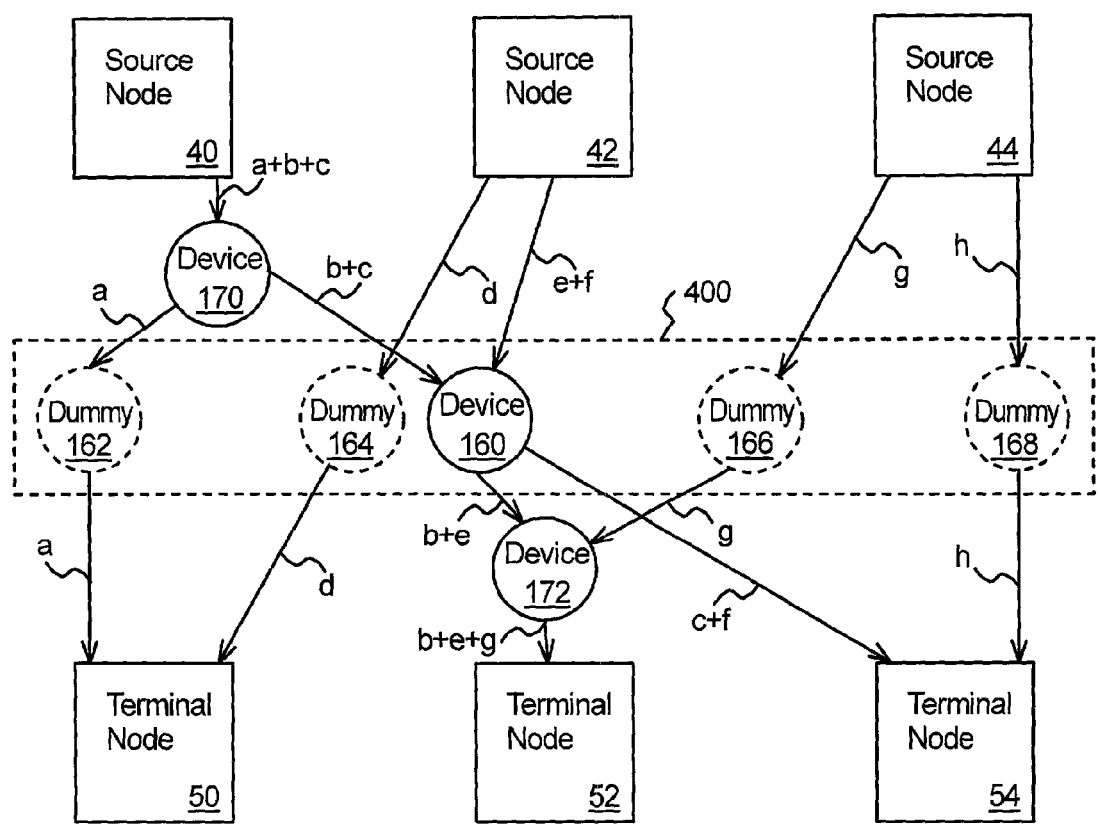

In the example of FIGS. 9 and 10, the only port violation among the terminal nodes 50, 52 and 54, is at the terminal node 52 and is a port violation of one. To alleviate this, the flow set having flows b and e and the flow set having the flow g may be merged. This is shown in FIG. 11 where an interconnect device 172 has been inserted to merge these flow sets. Note that there is now a link between the device 172 and the device 160. Accordingly, the addition of the device 172 adds another layer to the interconnect fabric.

The step 312 may terminate similarly to the method 200 of FIG. 1. Thus, the step 312 may terminate when no additional merges among flow sets in the newly added device layer are feasible or likely to result in a cost savings.

Next, the determination step 308 may be repeated to determine whether there exist any additional port violations at the terminal nodes. If violations remain, then the steps 310 and 312 may be repeated to add another layer between the prior layer and the terminal nodes. This process may be performed recursively, each time adding a layer of devices to the interconnect fabric and reducing the number of port violations at the terminal nodes. Each new layer may be added between the prior layer and the terminal nodes. Thus, in the example, if another layer were required, the layer of devices that includes the device 172 would be recast as the source nodes.

In the example of FIG. 11, the addition of the layer that includes the device 172 eliminates the port violation at the terminal node 52. Accordingly, no additional port violations at terminal nodes remain and, thus, no additional layers are needed. Under other circumstances, however, one or more additional layers may be required to eliminate all such port violations.

Once all of the port violations at the terminal nodes have been eliminated, the interconnect fabric design may be output from the method 300 in a step 316. The design may then be used to implement the interconnect fabric.

Figure 12:
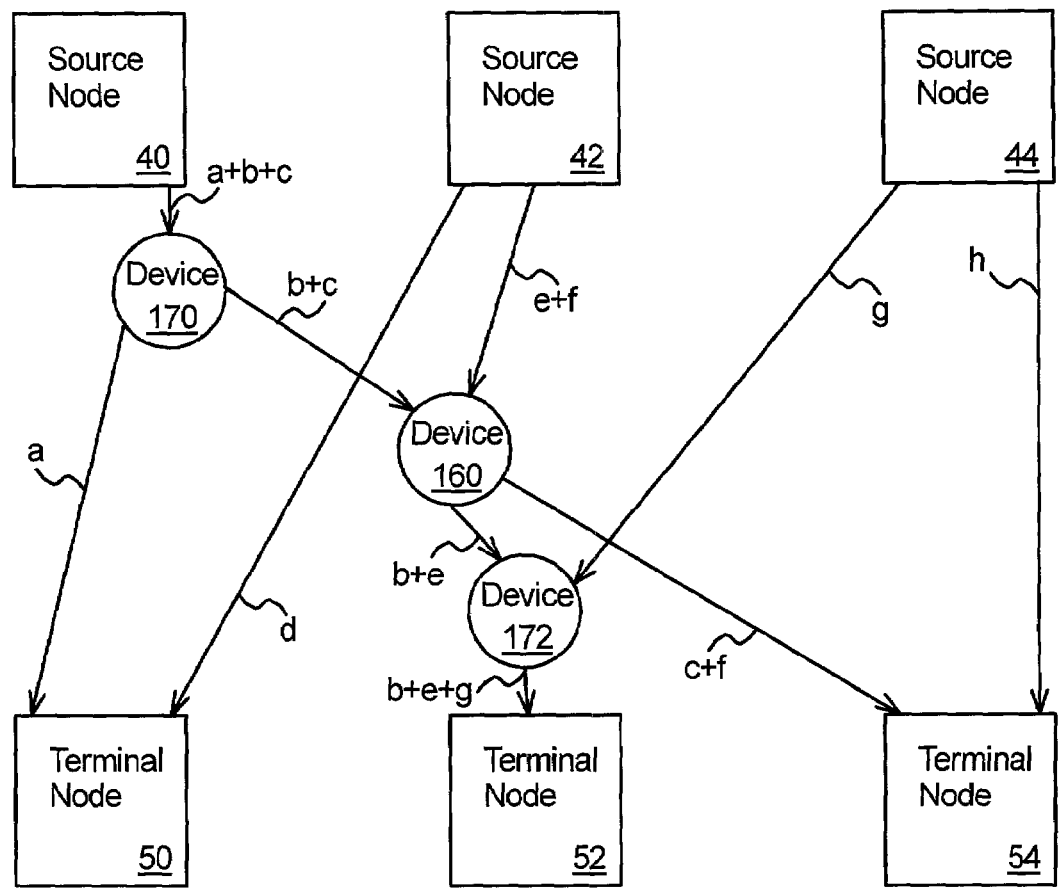

Assuming that dummy nodes were employed while forming the additional fabric layers, they may be removed in the step 316. FIG. 12 shows the interconnect fabric of the example with the dummy nodes removed. To accomplish this, the dummy nodes 162, 164, 166 and 168 connected links may each be replaced with a single link. Thus, in FIG. 12, the flow set having flow a may pass directly from the device 170 to the terminal node 50, the flow set having the flow d may pass directly from the source node 42 to the terminal node 50, the flow set having the flow g may pass directly from the source node 44 to the device 172 and the flow set having the flow h may pass directly from the source node 44 to the terminal node 54.

While the embodiment of FIG. 8 adds layers to the interconnect fabric to alleviate port violations at source nodes before adding layers to alleviate port violations at terminal nodes, it will be apparent that port violations at terminal nodes may be instead addressed before port violations at source nodes are addresses. It will also be apparent that one or more layers may be added to address terminal node port violations before all of the source node port violations have been eliminated and vice-versa (e.g., layers may be added alternately on each side of the layer 400).

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method of designing an interconnect fabric for communication between a set of source nodes and a set of terminal nodes, comprising:
   obtaining a design for an interconnect fabric having an interconnect device layer adjacent to either the set of source nodes or the set of terminal nodes, the interconnect device layer comprising a first interconnect device;
   identifying flow sets that traverse the interconnect device layer, each flow set specifying communication bandwidth between a source node of the set of source nodes and a terminal node of the set of terminal nodes and the flow sets including at least a first flow set that passes through the first interconnect device;
   merging a pair of the flow sets, the pair including at least the first flow set and said merging comprising adding a second interconnect device to the design, the second interconnect device being linked to the first interconnect device, thereby alleviating at least one port violation and adding an additional interconnect device layer that includes the second interconnect device to the design; and
   implementing the design.

2. The method according to claim 1, further comprising merging a pair of the flow sets that does not alleviate a port violation but results in cost savings.

3. The method according to claim 1, further comprising repeatedly performing, prior to said implementing, identifying an interconnect device layer adjacent to either the set of source nodes or the set of terminal nodes end said steps of identifying flow sets and merging a pair of the flow sets, until port violations are no longer present in the design, thereby adding one or more additional interconnect device layers to the design.

4. The method according to claim 1, wherein said obtaining comprises generating an arrangement of flow sets in response to a set of flow requirements for the source and terminal nodes and alleviating at least one port violation associated with the arrangement of flow sets by merging a pair of the flow sets in the arrangement.

5. The method according to claim 1, further comprising inserting a dummy node into the interconnect device layer for each link that traverses the interconnect device layer and that is not terminated in the interconnect device layer.

6. The method according to claim 1, further comprising determining for each source and terminal node one or more port violations including a number by which a set of ports for the corresponding flow sets exceed a set of available ports.

7. The method according to claim 6, wherein said merging a pair of the flow sets alleviates at least one port violation of a source or terminal node for which the number is highest.

8. The method according to claim 6, wherein said merging a pair of the flow sets alleviates at least one port violation of a source or terminal node for which the number is highest and also alleviates at least one port violation of a source or terminal for which the number is next highest.

9. The method according to claim 6, wherein said step of merging a pair of the flow sets alleviates at least one port violation of a source or terminal node for which the number is highest and for which the step of merging imposes a least cost or greatest cost savings.

10. The method according to claim 9, wherein cost is based on a cost of an interconnect device that carries the pair of flow sets.

11. The method according to claim 1, wherein said merging a pair of the flow sets comprises selecting pair by determining feasibility of merging the pair.

12. The method according to claim 11, wherein said determining feasibility comprises determining whether an available interconnect device has sufficient bandwidth to carry the pair of flow sets.

13. The method according to claim 11, wherein said determining feasibility comprises determining whether an available interconnect device has enough ports to carry the pair of flow sets.

14. The method according to claim 1, wherein the interconnect fabric comprises a storage area network.

15. A system for designing an interconnect fabric for communication between a set of source nodes and a set of terminal nodes comprising:
a design for an interconnect fabric having at least one interconnect device layer that includes a first interconnect device; and
a fabric design tool that modifies the design for the interconnect fabric by identifying flow sets that traverse the layer of interconnect devices, each flow set specifying communication bandwidth between a source node of the set of source nodes and a terminal node of the set of terminal nodes and the flow sets including at least a first flow set that passes through the first interconnect device, and merging a pair of the flow sets, the pair including at least the first flow set and said merging comprising adding a second interconnect device to the design, the second interconnect device linked to the first interconnect device, thereby alleviating at least one port violation and adding an additional interconnect device layer that includes the second interconnect device to the design.

16. The system according to claim 15, wherein said fabric design tool merges a pair of the flow sets that does not alleviate a port violation but results in cost savings.

17. The system according to claim 15, wherein said fabric design tool repeatedly adds additional interconnect device layers to the design until port violations are no longer present in the design.

18. The system according to claim 15, wherein said design for the interconnect fabric is obtained by generating an arrangement of flow sets in response to a set of flow requirements for the source and terminal nodes and alleviating at least one port violation associated with the arrangement of flow sets by merging a pair of the flow sets in the arrangement.

19. The system according to claim 15, wherein the fabric design tool inserts a dummy node into the interconnect device layer for each link that traverses the interconnect device layer and that is not terminated in the interconnect device layer.

20. The system according to claim 15, wherein the fabric design tool determines for each source and terminal node one or more port violations including a number by which a set of ports for the corresponding flow sets exceed a set of available ports.

21. The system according to claim 20, wherein the fabric design tool alleviates at least one port violation of a source or terminal node for which the number is highest.

22. The system according to claim 20, wherein the fabric design tool alleviates at least one port violation of a source or terminal node for which the number is highest and also alleviates at least one port violation of a source or terminal for which the number is next highest.

23. The system according to claim 20, wherein the fabric design tool alleviates at least one port violation of a source or terminal node for which the number is highest and for which the step of merging imposes a least cost or greatest cost savings.

24. The system according to claim 23, wherein the fabric design tool determines the cost based on a cost of an interconnect device that carries the pair of flow sets.

25. The system according to claim 15, wherein said the fabric design tool selects a pair of the flow sets for merger by determining feasibility of merging the pair.

26. The system according to claim 25, wherein the fabric design tool determines the feasibility by determining whether an available interconnect device has sufficient bandwidth to carry the pair of flow sets.

27. The system according to claim 25, wherein the fabric design tool determines the feasibility by determining whether an available interconnect device has enough ports to carry the pair of flow sets.

28. The system according to claim 15, wherein the interconnect fabric comprises a storage area network.

29. A method of designing an interconnect fabric for communication between a set of source nodes and a set of terminal nodes, comprising:
obtaining a design for an interconnect fabric having a interconnect device layer adjacent to either the set of source nodes or the set of terminal nodes, the interconnect device layer comprising at least one interconnect device; and
repeatedly forming a next interconnect device layer adjacent to either the set of source nodes or terminal nodes by identifying flow sets that traverse an existing adjacent interconnect device layer and merging a pair of the flow sets thereby alleviating at least one port violation, each added interconnect device layer comprising at least one interconnect device linked to an interconnect device of the existing adjacent interconnect device layer, thereby adding interconnect device layers to the design, until the design satisfies a set of flow requirements between the source nodes and terminal nodes without port violations.

30. The method according to claim 29, wherein each added interconnect device layer reduces a number of port violations by at least one, thereby each added interconnect device layer progresses the design toward a condition of having no port violations.

31. The method according to claim 29, further comprising merging a pair of the flow sets that does not alleviate a port violation but results in cost savings.

* * * * *

UNITED STATES PATENT AND TRADEMARK OFFICE
CERTIFICATE OF CORRECTION

| | | |
|---|---|---|
| PATENT NO. | : 7,076,537 B2 | Page 1 of 1 |
| APPLICATION NO. | : 10/027564 | |
| DATED | : July 11, 2006 | |
| INVENTOR(S) | : Julie A. Ward et al. | |

It is certified that error appears in the above-identified patent and that said Letters Patent is hereby corrected as shown below:

In column 11, line 2, in Claim 3, delete "end" and insert -- and --, therefor.

Signed and Sealed this

Twenty-eighth Day of April, 2009

JOHN DOLL
*Acting Director of the United States Patent and Trademark Office*